United States Patent
Muthiah et al.

(10) Patent No.: US 11,681,466 B2
(45) Date of Patent: Jun. 20, 2023

(54) PROACTIVE STORAGE OPERATION MANAGEMENT

(71) Applicant: Western Digital Technologies, Inc., San Jose, CA (US)

(72) Inventors: Ramanathan Muthiah, Bangalore (IN); Ramkumar Ramamurthy, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/917,470

(22) Filed: Jun. 30, 2020

(65) Prior Publication Data

US 2021/0405924 A1 Dec. 30, 2021

(51) Int. Cl.
*G06F 12/00* (2006.01)
*G06F 3/06* (2006.01)

(52) U.S. Cl.
CPC ............ *G06F 3/0659* (2013.01); *G06F 3/067* (2013.01); *G06F 3/0611* (2013.01); *G06F 3/0619* (2013.01); *G06F 3/0644* (2013.01); *G06F 3/0649* (2013.01); *G06F 3/0653* (2013.01); *G06F 3/0683* (2013.01)

(58) Field of Classification Search
CPC .... G06F 3/0611; G06F 3/0619; G06F 3/0644; G06F 3/0659
USPC ........................................................ 711/154
See application file for complete search history.

(56) References Cited

U.S. PATENT DOCUMENTS

| | | | |
|---|---|---|---|
| 6,216,169 B1 | 4/2001 | Booman et al. | |
| 8,156,561 B2* | 4/2012 | Mimatsu | G06F 21/78 713/193 |
| 8,346,735 B1 | 1/2013 | Tang et al. | |
| 8,516,232 B2* | 8/2013 | Dolgunov | G06F 13/385 370/254 |
| 10,389,800 B2* | 8/2019 | Blainey | H04L 67/1001 |
| 2005/0102479 A1* | 5/2005 | Innan | G06F 3/0665 711/114 |

(Continued)

FOREIGN PATENT DOCUMENTS

| | | |
|---|---|---|
| CA | 2559588 A1 | 9/2006 |
| EP | 3110072 B1 | 8/2017 |

OTHER PUBLICATIONS

U.S. Appl. No. 16/359,662 entitled "Solid State Drive Latency Estimation Interface for Host Performance Tuning".

(Continued)

*Primary Examiner* — Mohamed M Gebril
(74) *Attorney, Agent, or Firm* — Patent Law Works LLP

(57) ABSTRACT

Example storage systems, storage devices, and methods provide proactive management of storage operations to, for example, beneficially minimize bottlenecking, latency, and other issues. An example system has a storage pool with a first storage device and a second storage device, and a processor configured to generate a storage request including a storage command, include a command processing time constraint in the storage request, send the storage request to the first storage device, and receive, from the first storage device, a proactive response including an estimation for an execution of the storage command by the first storage device based on the command processing time constraint. The processor may then select a fallback mechanism for executing the storage command based on the proactive response.

20 Claims, 11 Drawing Sheets

(56) References Cited

U.S. PATENT DOCUMENTS

| | | | | |
|---|---|---|---|---|
| 2005/0240742 A1* | 10/2005 | Eng | ............ | G06F 11/3419 |
| | | | | 711/170 |
| 2007/0067584 A1* | 3/2007 | Muto | ............ | G06F 11/2071 |
| | | | | 714/E11.102 |
| 2009/0172333 A1 | 7/2009 | Marcu et al. | | |
| 2010/0169603 A1* | 7/2010 | Perry | ............ | G06F 3/0659 |
| | | | | 711/E12.004 |
| 2013/0268807 A1* | 10/2013 | Spencer | ............ | G06F 11/1415 |
| | | | | 714/18 |
| 2014/0075112 A1 | 3/2014 | Baptist et al. | | |
| 2014/0258910 A1* | 9/2014 | Liang | ............ | G06F 11/323 |
| | | | | 715/772 |
| 2014/0325519 A1* | 10/2014 | Li | ............ | H04L 67/01 |
| | | | | 718/103 |
| 2015/0199148 A1 | 7/2015 | Hrischuk et al. | | |
| 2015/0381436 A1 | 12/2015 | Jackson | | |
| 2016/0085465 A1* | 3/2016 | Schmier | ............ | G06F 3/0653 |
| | | | | 711/103 |
| 2017/0115891 A1* | 4/2017 | O'Krafka | ............ | G06F 3/0629 |
| 2018/0046395 A1* | 2/2018 | Sekimoto | ............ | G06F 3/0643 |
| 2018/0107719 A1* | 4/2018 | Albrecht | ............ | G06F 16/2228 |
| 2018/0183891 A1* | 6/2018 | Zhang | ............ | H04L 67/125 |
| 2018/0227238 A1* | 8/2018 | Buban | ............ | H04L 47/564 |
| 2018/0359308 A1* | 12/2018 | Davies | ............ | G06F 16/93 |
| 2019/0026031 A1 | 1/2019 | Kachare et al. | | |
| 2019/0334801 A1 | 10/2019 | Dutta et al. | | |
| 2019/0391761 A1* | 12/2019 | Brief | ............ | G06F 3/0656 |
| 2020/0050404 A1 | 2/2020 | Kim | | |
| 2020/0142619 A1 | 5/2020 | Ke | | |
| 2020/0234007 A1* | 7/2020 | Vainas | ............ | G06F 40/30 |
| 2020/0241795 A1* | 7/2020 | Yang | ............ | G06F 3/0659 |
| 2020/0301606 A1* | 9/2020 | Muthiah | ............ | G06F 3/0659 |
| 2020/0344084 A1* | 10/2020 | Shribman | ............ | H04L 61/2575 |
| 2021/0081266 A1* | 3/2021 | Kern | ............ | G06N 3/08 |
| 2021/0405924 A1* | 12/2021 | Muthiah | ............ | G06F 3/0653 |

OTHER PUBLICATIONS

International Search Report and Written Opinion for International Application No. PCT/US2021/016365, dated May 27, 2021, 10 pgs.

* cited by examiner

PROACTIVE STORAGE OPERATION MANAGEMENT

TECHNICAL FIELD

The present disclosure generally relates to data storage, and in a more particular example, to proactive management of storage operations.

BACKGROUND

Often, distributed storage systems are used to store large amounts (e.g., terabytes, petabytes, exabytes, etc.) of data, such as objects or files in a distributed and fault-tolerant manner with a predetermined level of redundancy.

Certain storage applications require strict completion requirements. These storage applications often require edge storage devices to similarly have fast computation capabilities and to meet various speed criteria.

In some cases, various different applications may have different quality-of-service (QoS) requirements, and quite often, during peak loads, the storage devices that the applications rely upon may not be able to keep up with the latency requirements. For instance, the number of requests may exceed the capabilities of the storage devices, the high volume may cause the performance of the storage devices to slow down and/or experience failures or faults, etc. A storage device rendering a result late in time may sharply affect performance such that the storage device no longer meets its expected QoS specifications (e.g., as measured by parts per million).

When the QoS of a storage device drops and causes delayed results, latency, failures, etc. (e.g., due to the device choking), the application may churn or seek other storage options. In some cases, the devices attempt to handle these scenarios and limit such issues, but these attempts have proved inadequate, particularly at scale and/or when demanding processing timelines are applicable.

A need exists for at least storage systems that are capable of mitigating the above-noted delays, latency, and/or other failures.

SUMMARY

Various aspects for proactive management of storage operations by storage systems are described.

One general aspect includes a storage system that has a storage pool having a plurality of storage devices including a first storage device and a second storage device. The system includes a processor coupled to the plurality of storage devices and configured to: generate a storage request including a storage command; include a command processing time constraint in the storage request; send the storage request to the first storage device; and receive, from the first storage device, a proactive response including an estimation for an execution of the storage command by the first storage device based on the command processing time constraint. Implementations may include one or more of the following features: that the processor is further configured to: select a fallback mechanism for executing the storage command based on the proactive response; that the proactive response received from the first storage device indicates that the first storage device relayed the storage request to the second storage device for execution; that to select the fallback mechanism for executing the storage command comprises relaying the storage request to the second storage device and providing an alternative timeline for executing the storage command; that the first storage device includes a controller configured to monitor a state of the first storage device, receive the storage request, determine that the storage command cannot be completed based on the state of the first storage device and the command processing time constraint, send the proactive response to the processor indicating a determination that the storage command cannot be completed; that the state indicates a storage device hardware failure, a storage device firmware state, a storage device processing load, or a latency associated with a processing of the storage command; that the controller is further configured to include data in the proactive response indicating a basis for the determination; the processor is further configured to, responsive to receiving the proactive response, select a fallback mechanism for executing the storage command, and select the fallback mechanism for executing the storage command based on the basis for the determination; a host system coupled to the storage pool via a network fabric; that the host system includes the processor the host system is configured to communicate with the storage pool via the network fabric; that the host system is further configured to receive a storage services request from a client device requesting execution of the storage command; and that the processor is further configured to, responsive to receiving the proactive response, send a storage services response to the client device indicating an estimated amount of time needed to complete the storage command.

Another general aspect includes a computer-based method that includes generating a storage request including storage command, including a command processing time constraint in the storage request, sending the storage request to a first storage device, and receiving, from the first storage device, a proactive response including an estimation for an execution of the storage command by the first storage device based on the command processing time constraint.

Implementations may include one or more of the following features: selecting a fallback mechanism for executing the storage command based on the proactive response; that selecting the fallback mechanism for executing the storage command comprises relaying the storage request to a second storage device or providing an alternative timeline for executing the storage command; monitoring a state of the first storage device; receiving the storage request; determining that the storage command cannot be completed based on the state of the first storage device and the command processing time constraint; sending the proactive response indicating a determination that the storage command cannot be completed; that the state indicates a storage device hardware failure, a storage device firmware state, a storage device processing load, or a latency associated with a processing of the storage command; including data in the proactive response indicating a basis for the determination; responsive to receiving the proactive response, selecting a fallback mechanism for executing the storage command; selecting the fallback mechanism for executing the storage command based on the basis for the determination; that the storage request is sent to the first storage device via a network fabric by a host system; that the proactive response is received by the host system via the network fabric from the first storage device; receiving a storage services request from a client device requesting execution of the storage command; responsive to receiving the proactive response, sending a storage services response to the client device indicating an estimated amount of time needed to complete the storage command; that the proactive response received from the first storage device indicates that the first storage device relayed the storage request to a second storage device for execution; sending a second storage request to a second storage device in parallel with the storage request; receiving a second proactive response from the second storage device; and selecting between the first storage device and the second storage device to execute the storage command based on the proactive response and the second proactive response.

Still another general aspect includes a system that includes means for storing data; means for generating a storage request including a storage command; means for including a command processing time constraint in the storage request; means for sending the storage request to the means for storing data; and means for receiving, from the means for storing data, a proactive response indicating an estimated issue with an execution of storage command by the means for storing data based on the command processing time constraint.

The various embodiments improve the functionality of storage systems to overcome or at least reduce the issues in the storage networks and/or systems discussed above and, accordingly, are more reliable and/or efficient than other computing networks. That is, the various embodiments disclosed herein include hardware and/or software that advantageously improves device QoS, saves client time, reduces failure or processing delays by proactively evaluating and acting on command latency, and beneficially provides a storage or a compute service with higher QoS performance and significantly reduced error PPM for various products. Also, the QoS storage devices can beneficially be benchmarked not just based on commands or computation per second but also based on the timely judgment to effectively accept/reject a storage or a compute request, meeting a given window in the first place. Beneficially, missing of timelines may also be avoided by the storage device on a proactive rejection until cleaning up its internal state, for example. It should be understood that the technology provides numerous additional advantages and benefits, as discussed in further detail herein.

It should be understood that the language used in the present disclosure has been principally selected for readability and instructional purposes, and not to limit the scope of the subject matter disclosed herein.

DETAILED DESCRIPTION

Figure 11:
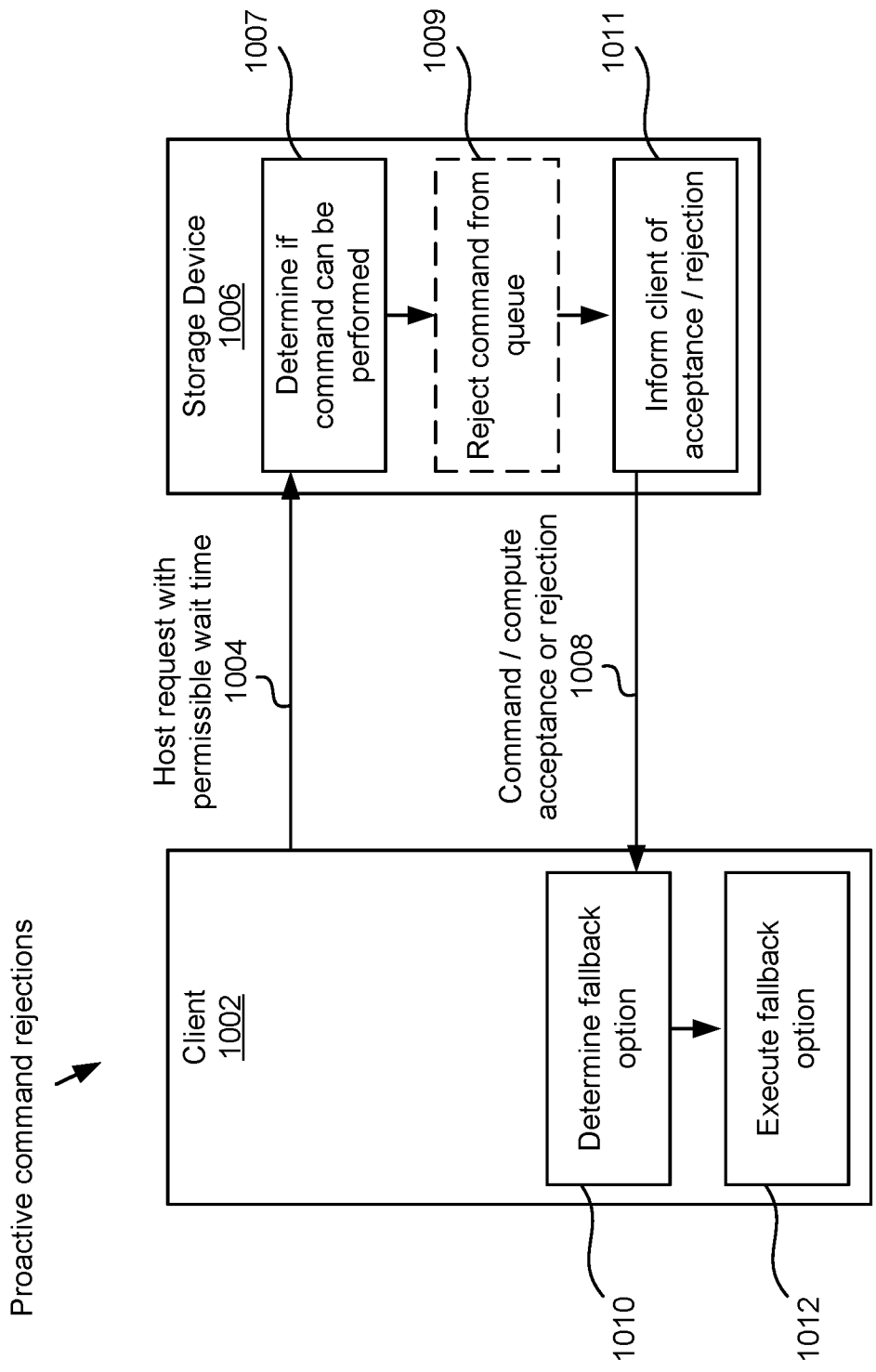
FIG. 11 is a diagram providing an overview of proactive command evaluation and processing.

The technology disclosed herein can advantageously proactively manage storage operations. The technology may include a system where storage devices comprising one or more storage media and one or more compute resources are coupled to the storage media and are pooled together for higher capacity and/or processing power. As shown in FIG. 11, which is a diagram providing an overview of proactive command evaluation and processing, a client 1002 may submit a host request and send it to a storage device 1006. The host request includes a permissible wait time for performing a requested storage command. The storage device 1006's compute resources determine 1007 if the command can be performed within the prescribed timeframe, and if not, rejects 1009 the command from the processing queue. The storage device 1006's compute resources then informs 1011 the client 1002 of the acceptance or rejection to process the command by sending a response that indicates such.

The client 1002, upon receiving the response and determining that the request was rejected, the client 1002 may determine if any fallback options are available. In some cases, the storage device 1006 rejects the host command (e.g., storage command, a compute processing command, etc.) request on the grounds that the storage device 1006 cannot complete the task within a tagged timeline. In further cases, the storage device 1006 can suggest a different time schedule in the response that it can adhere to. The storage device 1006 may also stub the request or suggest passing on the request to another storage device in the storage infrastructure, or it may itself pass it on to a capable device and indicate such in the response. For instance, a storage device can send a proactive signaling on the storage or compute completion time to the host or other requestor. The host or client may cancel the submitted request on determining that the estimated completion time does not suit the latency requirements. In another instance, upon determining that the storage device cannot meet the time deadline, the storage device may request in its proactive response that the host relay the request to another connected storage device.

As a further example, in real time critical processing systems such as a banking application, a financial instrument trading application, reservation applications, edge computing applications, etc., a given storage device can advantageously proactively determine that it cannot process a requested write command or compute request based on the determination that the requested timeline may not be honored due to possible flash failure, resource availability, or an internal storage firmware state. For instance, the storage device may determine that the requested command could potentially time out in storage. Accordingly, the storage device may proactively reject the command during submission queue evaluation, thereby saving crucial time for the client or host and allow it enough time for the host to reroute the request in a timely manner to another device, rather than waiting for the first device to respond.

Figure 1:
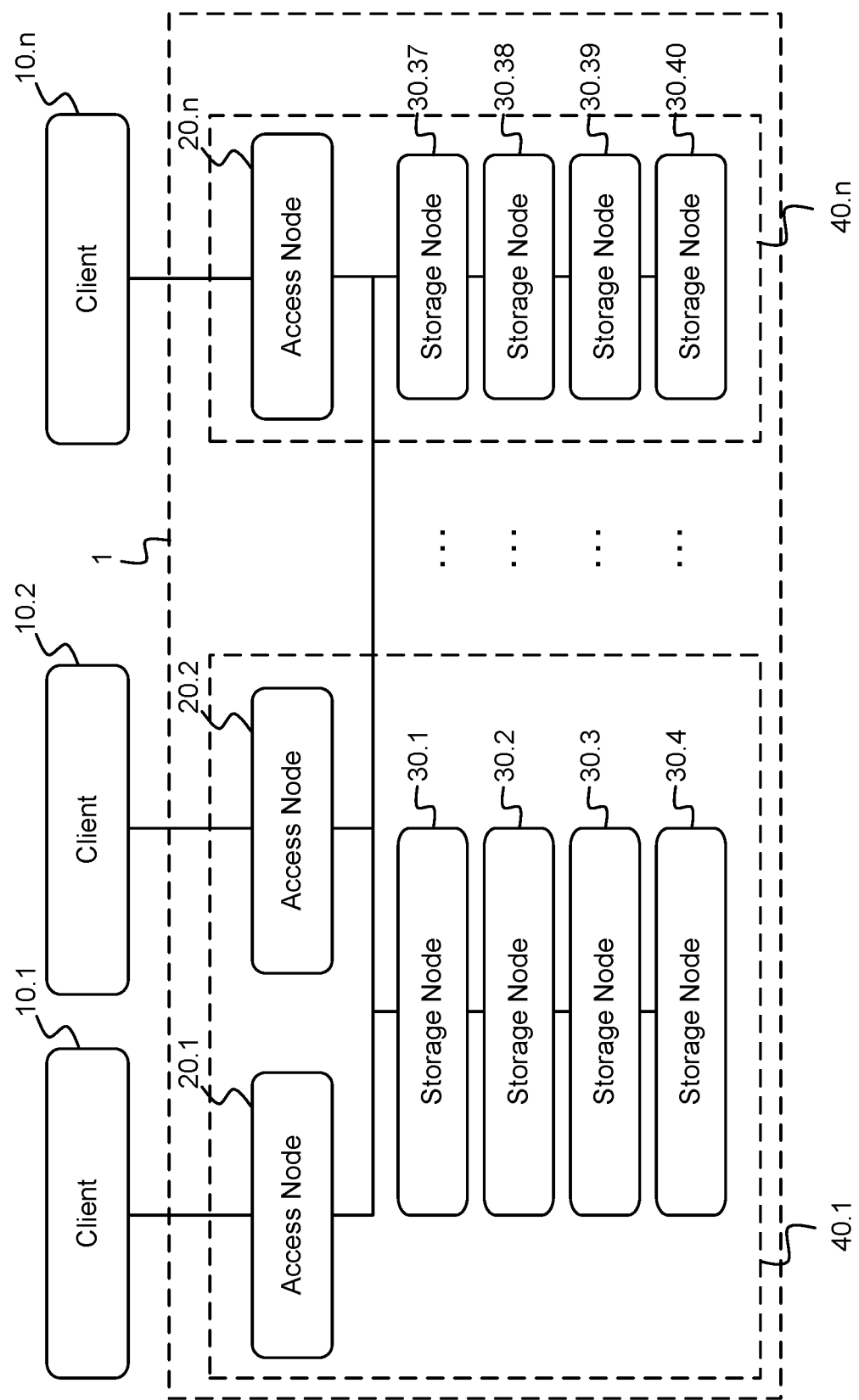
FIG. 1 schematically illustrates an example of a storage system.

FIG. 1 shows an embodiment of an example storage system 1. In some embodiments, the storage system 1 may be implemented as a distributed file, object, or other data storage system which is coupled to one or more clients 10.1-10.*n* for accessing data through one or more controller or access nodes 20.1-10.*n*.

The storage system 1 may include a plurality of controller or access nodes 20 and a plurality of storage nodes 30 which may be coupled in a suitable way for transferring data, for example by means of any suitable data communication network, such as a local area network (LAN), a wide area network (WAN), an intranet, the Internet, a cell phone network, or any combination of communication networks. Access nodes 20, storage nodes 30, and the computing devices comprising clients 10 may connect to the data communication network using any suitable wireless, optical, etc., network connections or any suitable combination of such network connections.

The control node(s) 20 may comprise a host system (also referred to as a host layer) that provides access to the storage system 1 to clients 10. For example, the host system may expose application programming interface(s) (API(s)) or any other suitable request handling interfaces that the clients 10 may interact with the access data and/or perform computing functions. The storage node(s) 30 may each comprise or include one or more storage devices that store and provide access to data and/or perform various compute functions.

Clients 10 may run or interface with one or more applications that use data stored in the storage system 1. Such an application could, for example, be a dedicated software application running on a client computing device, such as a personal computer, a laptop, a mobile phone, or any other type of communication device that can interface directly with the storage system 1.

In further embodiments, the applications could, for example, comprise a suitable file system which enables a general-purpose software application to interface with the storage system 1, an API library for the storage system 1, etc. In some embodiments, access nodes 20 may include a file interface system for receiving file data requests from clients 10 according to a file system protocol and access data in storage nodes 30.1-30.40 using a different storage protocol, such as an object storage protocol.

Although the embodiment of FIG. 1 shows only three access nodes 20 and forty storage nodes 30, the storage system 1 could comprise any other suitable number of interconnected access nodes 20 and storage nodes 30, such as but not limited to two, four, tens, hundreds, etc., or more access nodes 20 and two or more, tens, hundreds, etc., storage nodes 30.

These access nodes 20 and storage nodes 30 may be built as general-purpose computers or may be specially configured and/or physically adapted, such as configured for arrangement in large data centers (e.g., suitably configured to be arranged in modular racks 40.1-40.n comprising standard dimensions). Exemplary access nodes 20 and storage nodes 30 may be dimensioned to take up a single unit of such racks 40, which is generally referred to as 1U. Such an exemplary storage node may use a low-power processor and may be equipped with ten or twelve high capacity serial advanced technology attachment (SATA) disk drives and is connectable to the network over redundant Ethernet network interfaces.

An exemplary access node 20 may comprise high-performance servers and provide network access to clients 10 over multiple high bandwidth Ethernet network interfaces. Data can be transferred between clients 10 and such access nodes 20 by means of a variety of network protocols including hypertext transfer protocol (HTTP)/representational state transfer (REST) object interfaces, language-specific interfaces such as Microsoft .Net, Python or C, etc. Additionally, such access nodes may comprise additional high bandwidth Ethernet ports to interface with the storage nodes 30.

In some embodiments, HTTP/REST protocols complying with the Amazon Simple Storage Service (S3) object storage service may enable data transfer through a REST application protocol interfaces (API), although other storage protocols are also contemplated, such as network file system (NFS) protocols, small computer system interface (SCSI) protocols, fiber channel (FC) protocols, non-volatile memory (NVM) protocols, etc.

In some embodiments, access nodes 20 may operate as a highly available cluster of controller nodes with one or more integrated and/or independent interface systems, and provide for example shared access to the storage nodes 30, metadata caching, protection of metadata, etc.

In some embodiments, clients 10, access nodes 20, and/or storage nodes 30 may be interconnected using one or more network fabric protocols and related physical and logical network interface. For example, storage nodes may include non-volatile memory express (NVMe) compliant storage devices, such as solid-state drives (SSD) connected via peripheral component interconnect express (PCIe) physical interfaces. Storage nodes 30 may include NVMe interface controllers or other suitable controllers to connect to a wider network infrastructure, such as a Fibre Channel or Ethernet network that supports NVMe traffic.

As shown in FIG. 1 several storage nodes 30 can be grouped together, for example because they are housed in a single rack 40. For example, storage nodes 30.1-30.4 and 30.37-30.40 each are respectively grouped into racks 40.1 and 40.n. Access nodes 20 may be located in the same or different racks as the storage nodes to which the access nodes connect. A rack may have multiple access nodes, for example rack 40.1, a single access node as rack 40.n, or no access nodes (not shown) and rely on an access node in another rack or storage nodes or clients with built-in access node and/or controller node capabilities. These racks are not required to be located at the same location. They are often geographically dispersed across different data centers, for example, rack 40.1 can be located at a data center in Europe and 40.n at a data center in the USA. In further embodiments, other variations may apply where storage node 30 groups may be virtual or comprised of storage nodes 30 that are disparately located.

Figure 2:
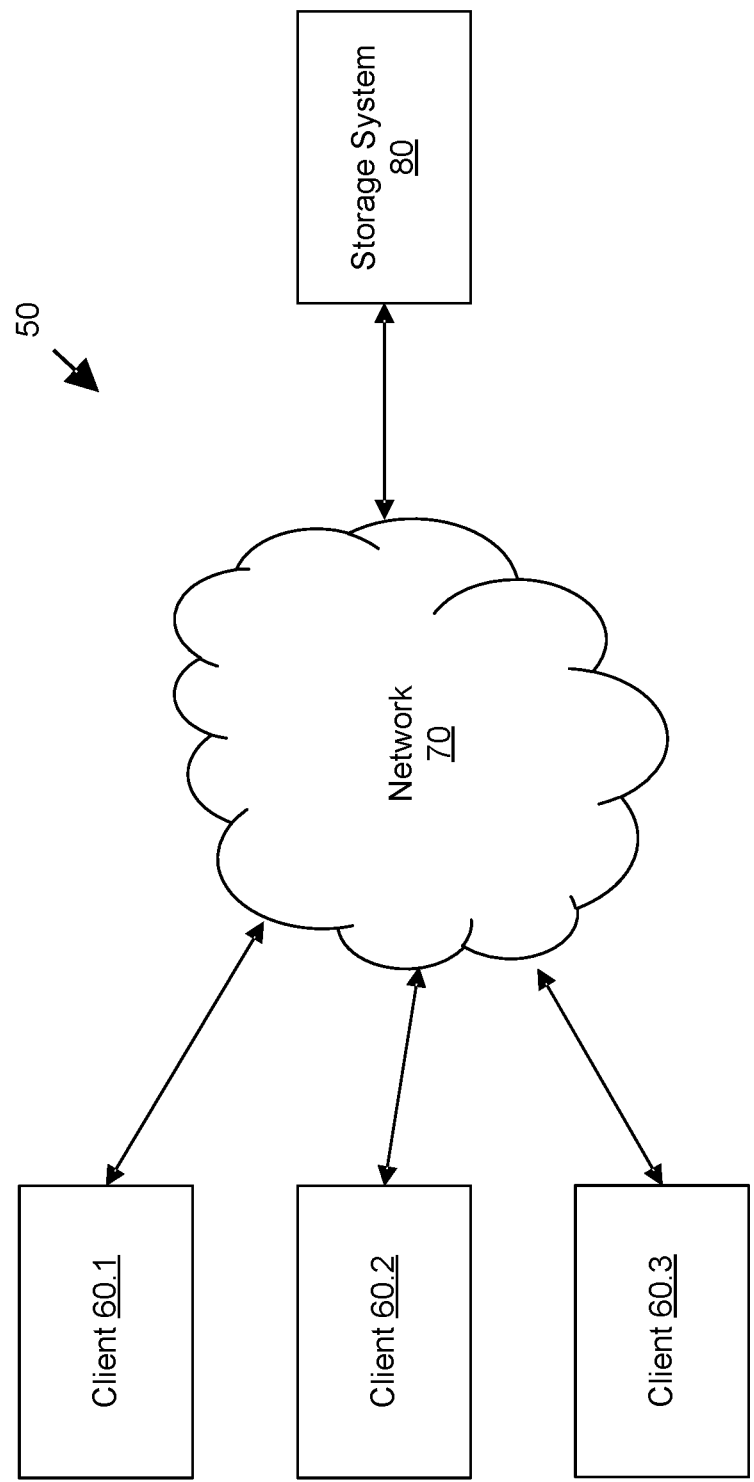
FIG. 2 schematically illustrates an example client architecture in which the storage system of FIG. 1 may operate.

FIG. 2 is a block diagram of an example storage network 50 using a client architecture. In some embodiments, storage system 1 may be embodied in such a storage network 50. As shown, storage network 50 can include multiple client devices 60 capable of being coupled to and in communication with a storage network 50 via a wired and/or wireless network 70 (e.g., public and/or private computer networks in any number and/or configuration (e.g., the Internet, an intranet, a cloud network, etc.)), among other examples that may include one client device 60.1 or two or more client devices 60 (e.g., is not limited to three client devices 60.1-60.3).

A client device 60 can be any computing hardware and/or software (e.g., a thick client, a thin client, or a hybrid thereof) capable of accessing storage system 80 utilizing network 70. Each client device 60, as part of its respective operation, relies on sending input/output (I/O) requests to the storage system 80 to write data, read data, and/or modify data. Specifically, each client device 60 can transmit I/O requests to read, write, store, communicate, propagate, and/or transport instructions, data, computer programs, software, code, routines, etc., to the storage system 80. Client device(s) 60 and storage system 80 may comprise at least a portion of a client-server model. In general, the storage system 80 can be accessed by client device(s) 60 and/or communication with storage system 80 can be initiated by client device(s) 60 through a network socket (not shown) utilizing one or more inter-process networking techniques. In some embodiments, client devices 60 may access one or more applications to use or manage a distributed storage system, such as storage system 1 in FIG. 1. In some embodiments, a storage system 80 may be a local storage system that is coupled directly to a client 60 via a wired connection or a local network connection (a consumer's Wi-Fi™ network). Other variations are also applicable.

Figure 3:
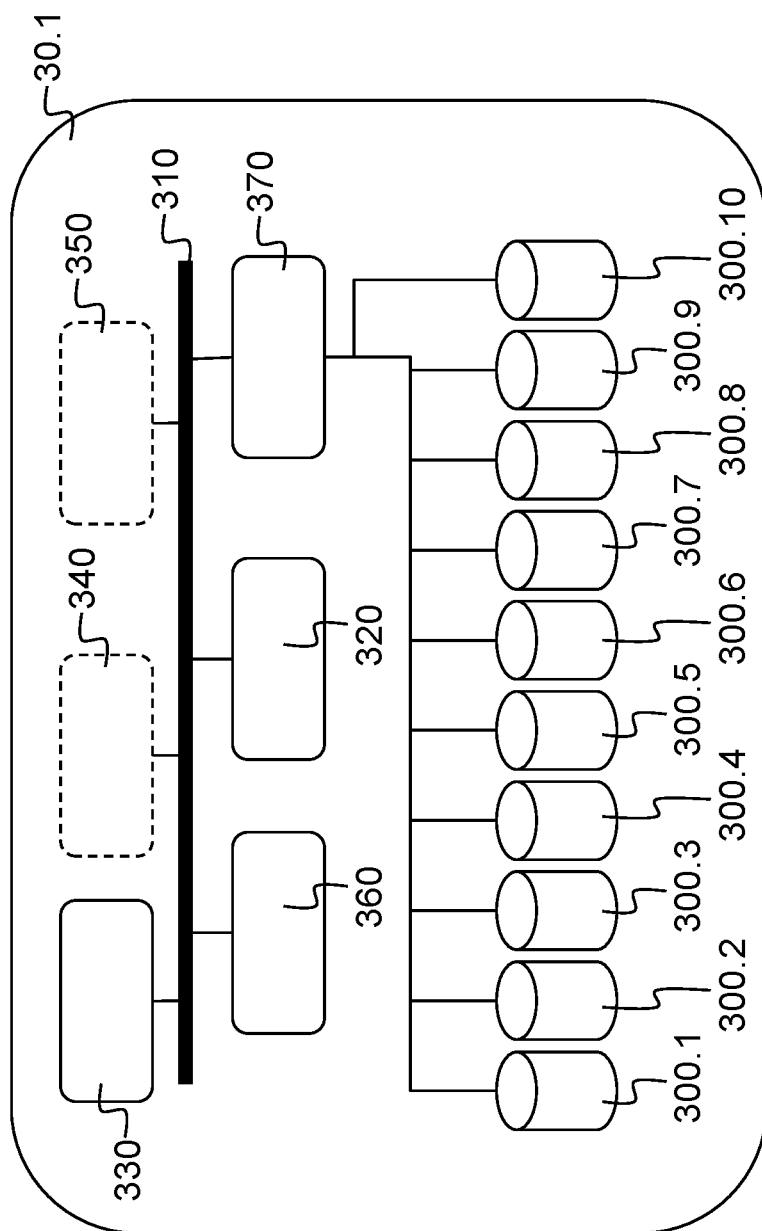
FIG. 3 schematically illustrates an example of a storage node of the storage system of FIG. 1.

FIG. 3 shows a schematic representation of an embodiment of one of the storage nodes 30. Storage node 30.1 may comprise a bus 310, a processor 320, a local memory 330, one or more optional input units 340, one or more optional output units 350, a communication interface 360, a storage element interface 370, and two or more storage elements 300.1-300.10. Bus 310 may include one or more conductors that permit communication among the components of storage node 30.1. Processor 320 may include any type of suitable processor or microprocessor that interprets and executes instructions. Local memory 330 may include random-access memory (RAM) or another type of dynamic storage device that stores information and instructions for execution by processor 320 and/or a read-only memory (ROM) or another type of static storage device that stores static information and instructions for use by processor 320. Input unit 340 may include one or more suitable mechanisms that permit an operator to input information to the storage node 30.1, such as a keyboard, a mouse, a pen, voice recognition and/or biometric mechanisms, etc. Output unit 350 may include one or more suitable mechanisms that output information to the operator, such as a display, a printer, a speaker, etc. Communication interface 360 may include any transceiver-like mechanism that enables storage node 30.1 to communicate with other devices and/or systems, for example, mechanisms for communicating with other storage nodes 30 or access nodes 20, such as, for example, gigabit (Gb) Ethernet interfaces.

Storage element interface 370 may comprise a storage interface, for example, a SATA interface, SCSI, a PCIe/NVMe interface, or another suitable interface, for connecting bus 310 to one or more storage elements 300, such as one or more local storage drives, for example, multi-terabyte (TB) SATA disk drives, or multi-terabyte (e.g., 2 TB) NVMe SSDs, or another suitable storage drive, and control the reading and writing of data to/from these storage elements 300. In one exemplary embodiment, as shown in FIG. 3, such a storage node 30.1 could comprise ten 6 TB SATA disk drives as storage elements 300.1-300.10 and in this way storage node 30.1 would provide a storage capacity of 60 TB to the storage system 1.

According to the exemplary embodiment of FIG. 1, and in the event that storage nodes 30.2-30.40 are identical to storage node 30.1 and each comprises a storage capacity of 60 TB, the storage system 1 would then have a total storage capacity of 2400 TB. Similarly, storage node 30.1 could comprise ten 2 TB SSDs as storage elements 300.1-300.10 and provide 20 TB to the storage system 1, resulting in a total storage capacity of 800 TB. Any suitable storage capacity is applicable. For instance, in some configurations, the storage system 1 may include a mix of storage nodes with different configurations, such as SSDs, HDDs, other storage device types, etc., of varying capacities.

As is clear from FIGS. 1 and 3, the storage system 1 may comprise a plurality of storage elements 300. As will be described in further detail below, the storage elements 300, could also be referred to as redundant storage elements 300 as the data is stored on these storage elements 300 such that none or a specific portion of the individual storage elements 300 on its own is critical for the functioning of the storage system. Each of the storage nodes 30 may comprise a share of these storage elements 300.

As shown in FIG. 3, storage node 30.1 comprises ten storage elements 300.1-300.10. Other storage nodes 30 could comprise a similar amount of storage elements 300 or may have different amounts, depending on the configuration. Storage node 30.2 could, for example, comprise six storage elements 300.11-300.16, and storage node 30.3 could, for example, comprise four storage elements 300.17-300.20.

The storage elements 300 or a portion thereof may be redundant and operate independently of one another. For instance, if one particular storage element 300 fails its function it could conveniently be taken on by another storage element 300 in the storage system 1.

Figure 4:
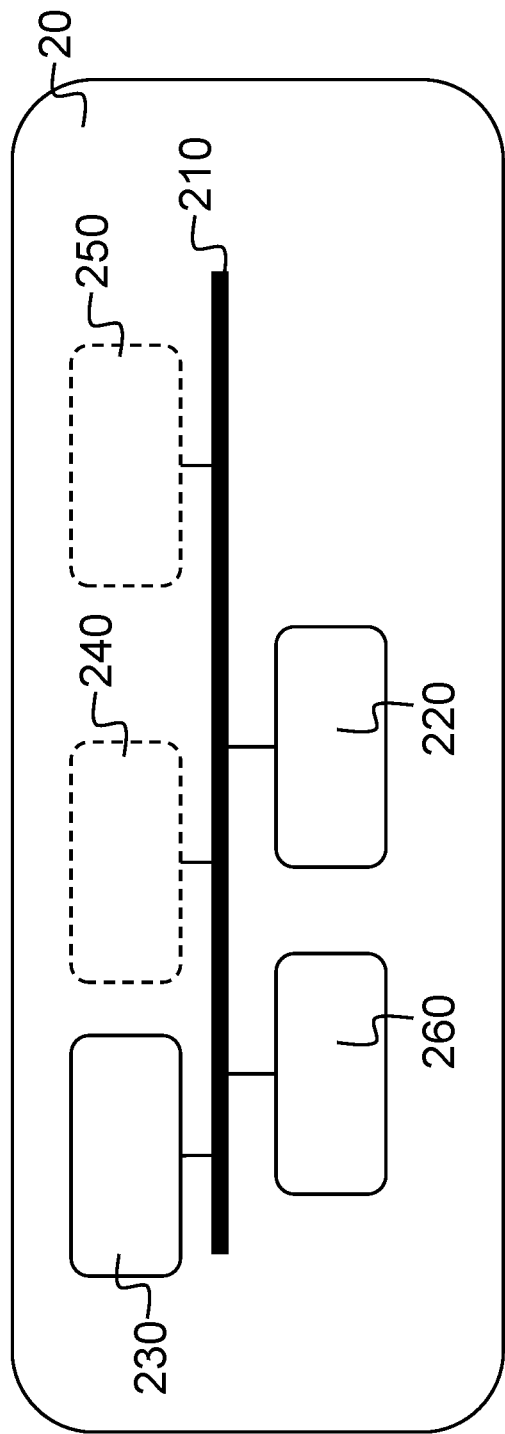
FIG. 4 schematically illustrates an example of a controller node or access node of the storage system of FIG. 1.

FIG. 4 shows a schematic representation of an embodiment of the controller or access node 20. Access node 20 may include storage controller node functions and/or file system interface functions for client systems using file system protocols to access data stored in data objects in storage nodes 30. Access node 20 may comprise a bus 210, a processor 220, a local memory 230, one or more optional input units 240, one or more optional output units 250. In some embodiments, access node 20 may include object storage management functions, including object storage interface functions, version control management, and/or replication engines.

Bus 210 may include one or more conductors that permit communication among the components of access node 20. Processor 220 may include any type of suitable processor or microprocessor that interprets and executes instructions. Local memory 230 may include a random access memory (RAM) or another type of dynamic storage device that stores information and instructions for execution by processor 220 and/or a read-only memory (ROM) or another type of static storage device that stores static information and instructions for use by processor 320 and/or any suitable storage elements such as a hard disk or a solid-state storage element. An optional input unit 240 may include one or more suitable mechanisms that permit an operator to input information to the access node 20 such as a keyboard, a mouse, a pen, voice recognition and/or biometric mechanisms, etc. Optional output unit 250 may include one or more suitable mechanisms that output information to the operator, such as a display, a printer, a speaker, etc. Communication interface 260 may include any transceiver-like mechanism that enables access node 20 to communicate with other devices and/or systems, for example, mechanisms for communicating with other storage nodes 30 or access nodes 20 such as, for example, Gb Ethernet interfaces.

According to an alternative embodiment, the access node 20 could have an identical design as a storage node 30, or according to still a further alternative embodiment one of the storage nodes 30 of the distributed object storage system could perform both the function of an access node 20 and a storage node 30. According to still further embodiments, the components of the access node 20 as described in more detail below could be distributed amongst a plurality of access nodes 20 and/or storage nodes 30 in any suitable way. According to still a further embodiment, the clients 10 may run an access node 20. According to still further embodiments, access node 20 may be embodied in separate controller nodes and interface nodes with or without redundancy among the controller nodes and/or interface nodes.

Figure 5:
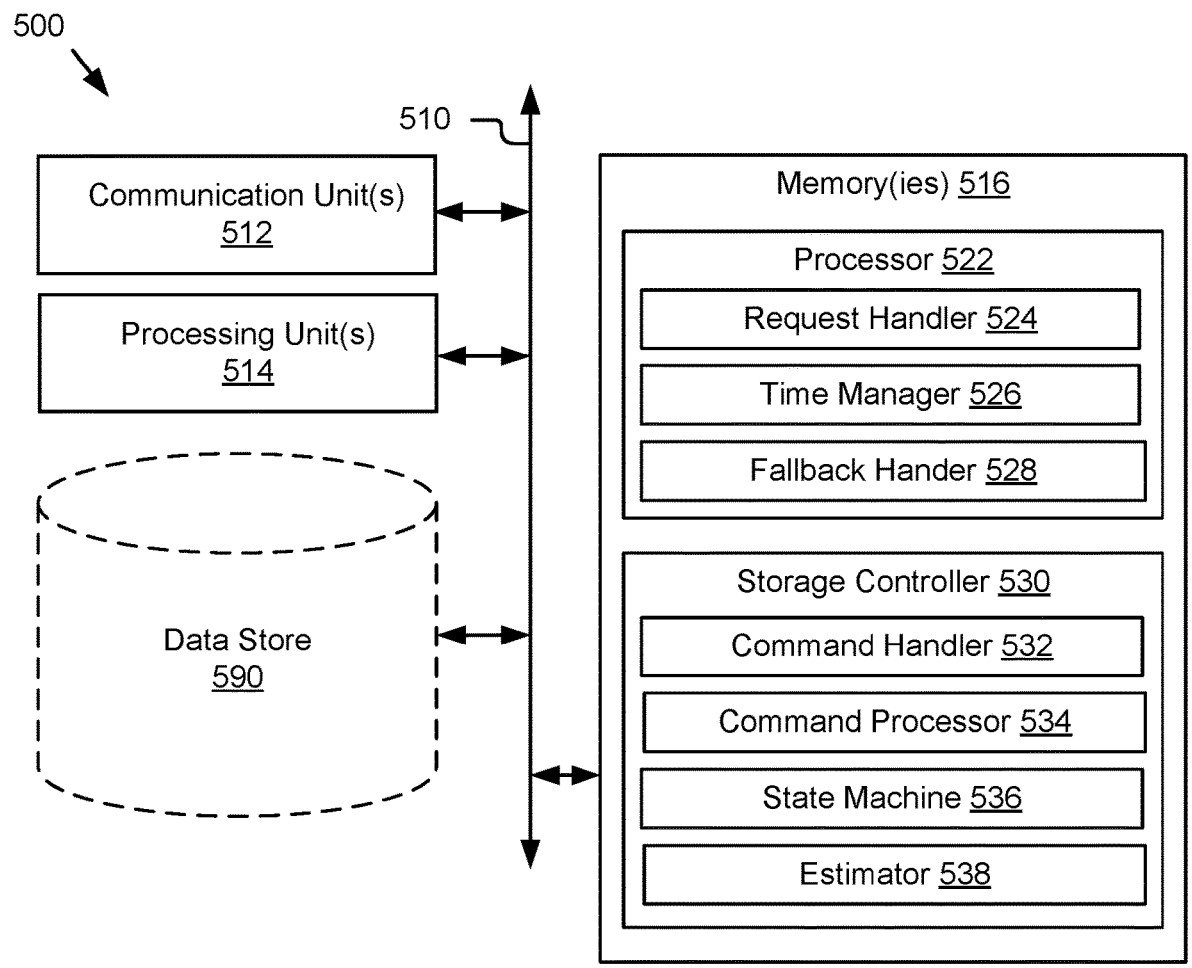
FIG. 5 schematically illustrates an example computing system.

FIG. 5 illustrates a block diagram of an example processing system 500 that may embody various different components of a storage system, such as a host system or storage device. In some embodiments, the processing system 500 may incorporate elements and configurations similar to those shown in FIGS. 1-4 and/or 6. For example, the processing system 500 may embody a host system 604, one or more storage devices 640, one or more access nodes 20, and/or one or more storage nodes 30, and may be configured with one or more of the components shown. In some embodiments, some components shown may be included in a host system 604 and some components may be included in one or more storage devices 640. In further embodiments, the components may be consolidated in on one or more storage devices 640, such as within a storage node 30 or a stand-alone storage device 640. Other variations are also possible.

As shown, the processing system 500 may include a bus 510 interconnecting communication unit(s) 512, processing unit(s) 514, and memory(ies) 516. The bus 510 may include one or more wired or wireless couplings (e.g., conductors) that permit communication among the components of access system 500. The communication unit(s) 512 may include any transceiver-like mechanism that enables access system 500 to communicate with other devices and/or systems. For example, the communication unit(s) 512 may include wired or wireless mechanisms for communicating with file system clients, other access systems, and/or one or more data storage systems or components. In some embodiments, the communication unit(s) 512 may enable communication among fabric nodes in a storage network fabric and host systems, access nodes, storage nodes, and/or subcomponents thereof, such as storage devices, may be configured as fabric nodes.

The processing unit(s) 514 may include any type of processor or microprocessor that interprets and executes instructions. Memory(ies) 516 may include a random access memory (RAM) or another type of dynamic storage device that stores information and instructions for execution by processing unit(s) 514 and/or a read-only memory (ROM) or another type of static storage device that stores static information and instructions for use by processing unit(s) 514 and/or any suitable storage elements such as a hard disk or a solid-state storage element.

Depending on the configuration, the processing system 500 may include or have access to one or more databases and/or specialized data stores, such a metadata store. The databases may include one or more data structures for storing, retrieving, indexing, searching, filtering, etc. of structured and/or unstructured data elements. The databases, metadata store, etc., and/or other databases or data structures may be maintained and managed in the processing system 500 or separate computing systems, such as storage nodes, controller nodes, or access nodes, with separate communication, processor, memory, and other computing resources and accessed by the processing system 500 through data access protocols.

The processing system 500 may include a data store 590 comprised of one or more storage media, such as the non-transitory storage media discussed herein (e.g., 644, those discussed with reference to the storage nodes 30, etc.), a plurality of executable components or subsystems that are stored and/or instantiated in one or more memory(ies) 516 for execution by processing unit(s) 514. For example, the memory(ies) may include a processor 522 having a request handler 524, a time manager 526, and a fallback handler 528, and may include a storage controller 530 having a command handler 532, a command processor 534, a state machine 536, and an estimator 538. These components may comprise computer logic executable to perform the acts and functionality described herein. Some or all of the components 522, 524, 526, 528, 530, 532, 534, 536, and/or 538 may be implemented using software executable by one or more processing units 514, using hardware, such as but not limited to a field-programmable gate array (FPGA), an application-specific integrated circuit (ASIC), etc., and/or a combination of hardware and software, etc.

Figure 6:
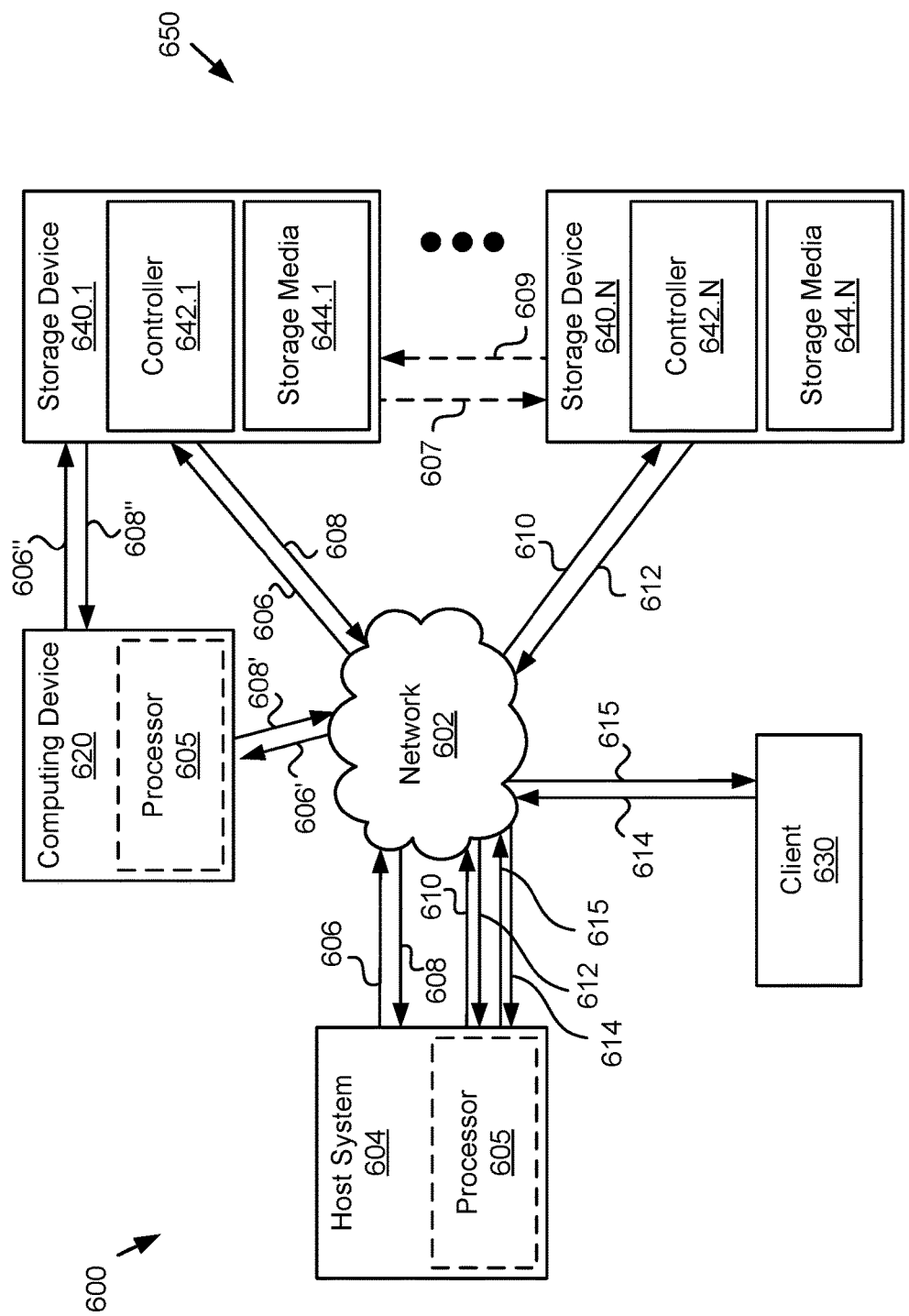
FIG. 6 schematically illustrates an example data flow between various elements of a storage system.

FIG. 6 schematically illustrates an example data flow between various elements of a storage system 600. As shown, the system includes a host system 605, a plurality of storage devices 640.1 . . . 640.N that form a storage pool 650, a client 630, and a computing device 620. The host system 605, the plurality of storage devices 640.1 . . . 640.N (also collectively or individually referred to as 640), the client 630, and the computing device 620 are coupled for communication via the network 602. The host system 604 and/or the computing devices 620 may include a processor 605. In some embodiments, the processor 605 may comprise a processing system 500 that includes communication unit(s) 512, processing unit(s) 514, and memory(ies) 516, which include an instance of the processor 522, which, when executed, is configured to, among other things, receive, process, and respond to storage service requests from clients, such as the client 630; send requests to and receive responses from the storage devices 640; determine fallback storage options for satisfying or otherwise responding to the storage service requests, etc., as discussed further elsewhere herein.

The storage devices 640.1 . . . 640.N may respectively include controllers 642.1 . . . 642.N and storage media 644.1 . . . 644.N (also collectively or individually referred to as 644). A storage media 644 may comprise any number and/or types of non-transitory storage mediums (e.g., SSD, HDD, etc.), such as those described elsewhere herein with respect to the access nodes 30, for example. In some embodiments, the storage devices 640 may embody the access nodes 30. A controller 642 may comprise a processing system 500 that includes communication unit(s) 512, processing unit(s) 514, and memory(ies) 516. The memory(ies) 516 may include an instance of the storage controller 530 (also called a controller 530), which, when executed, is configured to, among other things, receive, evaluate, and execute storage commands, provide proactive responses, etc., as discussed further elsewhere herein.

By way of example, an application executing on a client 630 may generate and send a storage service request 614 to the host system 604 via the network 602. The storage service request 614 may comprise a read request, a write request, a deletion request, a compute request, or some other suitable request. In another example, the processor 605 may receive an internal storage service request from an application operating on the computing device 620. Other variations are also possible and contemplated.

The request handler 524 of the processor 522 may receive the storage service request 614, interpret the storage service request 614, and generate a corresponding storage request to send to one or more storage devices 640. In some embodiments, the storage service request may include data describing the service to be performed and the parameters for performing it, such as a processing time constraint. The processing time constraint may define a time by which the storage service request should be satisfied, a duration for performing the services, or another similar time condition. The request handler 524 may process the parameters from the storage service request 614 and include relevant parameters in the storage request.

In some embodiments, the request may not include a time constraint and the time manager 526 may determine it. For instance, a stakeholder of an application may set predefined time constraints for various storage commands (e.g., such as storage commands called from specific methods, modules, or applications, etc.), various storage command types (e.g., reads, writes, deletes, certain computing operations, etc.), the time of day, day of year, and/or other parameters, and the time manager 526 may select the appropriate time constraint based on the request, such as the nature of the storage command, the sender of the storage command, a date and/or time the request was received and/or the storage command is to be executed, etc. Other variations are also possible and contemplated.

Once generated, the request handler 524 may send the storage request to one or more of the storage devices 640. For instance, the request handler 524 may send the storage request to the storage device 640.1 for processing. In some embodiments, the request handler 524 may send multiple parallel requests 606 and 610, and select the first storage device 640.1 that indicates in a proactive response (e.g., 608 or 612) and that it can successfully process the storage command. In such embodiments, the proactive response may include an indication that the storage command can be processed and the command processor 534 is configured to await confirmation before proceeding to carry out the storage command. Other variations are also possible and contemplated.

A command handler 532 of the controller 642.1 may receive the storage request, interpret the storage request to determine the storage command, any data associated with (e.g., to be stored, retrieved, processed by, etc.) the storage command, and any parameters associated with the storage command. Example storage commands may include reading data from the storage media 644.1, writing data to the storage media 644.1, deleting data from the storage media 664.1, performing a compute operation (e.g., converting a file, image, etc., processing an object using machine learning logic, calculating a result using input data, etc.), etc., although any other suitable operations may also be applicable. The command handler 532 may process one or more parameters for the storage command included in the storage request, such as a command processing time constraint from the storage request.

The command handler 532 may maintain and process queue and add or remove queued commands as they are rejected, processed, etc. In some cases, the command handler may prioritize read commands since host systems may wait for them and because it is often preferable not to reject them due to dependencies, such as a data retrieval from storage media of the storage device 640.1. In contrast, write commands may have no dependencies, and, as a fallback, the command can be passed to other storage devices 640 within the storage system 600. Further, if the storage device 640.1 is busy, the timeline can be extended, or some other fallback may be selected that is suitable. In some cases involving RAID systems, read rejections may possible if the host can access the complete data from a different storage device 640.

In some cases, the command handler 532 may reject certain commands, such as a compute operation, when the estimator 538 determines that peak storage loads are keeping the underlying resources busy in the device based on the state. The storage device 640 may be responsible for handling both storage as well as compute operations, and because its resources, such as flash channels, caches, and dies, are being utilized for both the modes, the estimator 538 may determine to honor some of the compute requests during that peak period or portions thereof.

The command handler 532 may signal the estimator 538 to process the information from the storage request to proactively determine whether the storage command can be processed in accordance with the command processing time constraint. The estimator 538 may receive the state from the state machine 536 and use it along with the command processing time constraint to proactively determine whether the storage command can be processed in accordance with the command processing time constraint. In further embodiments, the estimator 538 may receive the state from storage, such as retrieve it from a memory 516. Example storage device conditions that the state may indicate include a storage device hardware failure, a storage device firmware state, a storage device processing load, and/or a latency associated with a processing of the storage command.

By way of example, the estimator 538 may evaluate the state it receives, determine based on the evaluated state whether the storage device 640.1 can process the storage command in accordance with the command processing time constraint. The proactive response may include data indicating the result, such as a boolean reflecting whether the storage command is processable based on the parameters (e.g., time constraint), a probability score indicating the probability that the storage command is processable based on the parameters (e.g., a confidence score between 0-100% or some other arbitrary ranking and scale), some other suitable quantification, etc., and/or data indicating one or more alternative options for executing the storage command. For example, in some embodiments, the estimator 538 may determine the storage command is processable but not within the timeframe requested and may determine an alternative for processing the storage command. For instance, the alternative may be a longer timeframe in which the storage command can be processed, an alternative storage device 640 that is capable of processing the storage command, or another suitable alternative as discussed elsewhere herein.

In some embodiments, the estimator 538 may determine the storage command is not processable due to an error state of the storage device 640.1 (e.g., a hardware failure, a firmware issue, a device connectivity limitation, etc.), a warning state of the storage device 640.1 (e.g., an elevated processing queue level that exceeds a nominal processing level, an elevated latency associated with receiving, reading, or storing data, etc., relative to nominal latency levels), etc. The proactive response may also include data indicating the storage command that was requested, an identifier associated with the request for executing the storage command, data reflecting the parameters for processing the storage command, etc.

The state machine 536 may monitor the operational parameters of the storage device 640 and determine the operational state of the storage device 640. The state of the storage device 640 may reflect the present health and/or processing efficiency or capability of the storage device 640. The state machine 536 may dynamically determine the state responsive to receiving a request from another component, such as the estimator 538, and/or may iteratively determine the state and store data reflecting the state in storage, such as a memory 516, for retrieve by other components, such as the estimator 538.

The estimator 538 may, in some embodiments, use machine learning logic that is trained based on previously processed storage commands. The features of these storage commands, such as their processing time, the command types (e.g., read, write, compute, delete, etc.), other processing parameters, etc., may be aggregated and used to create feature sets for training a machine learning model. Any suitable learning approach may be used, such as supervised learning, unsupervised learning, and/or reinforcement learning, or other approaches such as topic modeling, meta-learning, etc. Similarly, any suitable machine learning model may be used, such as artificial neural networks, decision trees, support vector machines, regression analysis, Bayesian networks, and federated learning models. By way of example, data describing one-hundred thousand write commands for writing a data of a certain size or within certain size ranges to a particular solid-state storage device (e.g., device model, memory type, etc.) may be used to train the estimator's 538 machine learning logic. As the command processor 534 processes additional write commands, the command processor 534 may determine the attributes of the write commands and provide them to the estimator 538, which may use them to further train and enhance the precision of the machine learning logic. The machine learning logic may output a probability score or some other metric for determining whether the storage command can be suitably processed.

Once the estimator 538 has evaluated the storage command for processing, it can generate and send a proactive response 608 to the host system 604 and/or signal for the command processor 534 to proceed with processing the storage command. In some embodiments, the estimator 538 may signal the command handler 532 or another component to generate and/or send the proactive response 608, and in further embodiments, the estimator 538 may perform this processing.

Based on the proactive response, the fallback handler 528 may select an alternative for processing the storage command (e.g., read, write, compute, etc.). For example, the fallback handler 528 may relay (e.g., retransmit, resend, generate and send a corresponding request, etc.) the storage request to another storage device, such as the storage device 640.N; may determine an alternative timeline for executing storage command and resend the storage request to the same storage device 640.1 with a revised command processing time constraint; may reject the processing of the storage command and send a response 615 including such to the requestor (e.g., client 630); may relay the results of the proactive response to the requestor and provide functionality (e.g., via one or more APIs or other functions) for the requestor to reply with its preference on which fallback option it would prefer (e.g., respond with a revised timeframe for processing the storage command); or another suitable fallback option. In some embodiments, the command handler 532, based on the storage command processing estimation generated by the estimator 538, may send a corresponding request to another storage device (e.g., 640.N) in the storage pool 650.

For example, the command handler 532 of the storage device 640.N may receive the corresponding request 607 from the command handler 532 of the storage device 640.1, which may be processed by the controller 642.N of the storage device 640.N (in a similar manner) to determine whether it can carry out the storage command within the command processing time constraint. If it can, the alternative storage device (e.g., 642.N) may proceed to carry out the storage command and send the results in a response 609 to the storage device 640.1 that sent the corresponding storage request, in a response 612 to the host system 604, or another requester (e.g., an application operating on the computing device 620, the processor 605 of the computing device 520), etc. If sent to the storage device that sent the corresponding storage request (e.g., storage device 640.1), the command handler 532 of that device may generate and send a response 608 (e.g., to the request handler 524 or another suitable requestor) indicating that the storage command was successfully processed by the peer storage device. The response 608 may identify the storage device that ended up processing the storage command, including an identifier associated with the processing, and/or include a payload with any results and/or data relevant to storage command.

In another example, if the controller 642.N determines that it can process the storage command in conformance with the command processing time constraint, the controller 642.N may generate and send confirmation of such to the requesting storage device 640.1, and the command handler 532 or estimator 538 may include data reflecting the option in the proactive response. In this way, if the storage device 640.1 is unable to process the storage command within the command processing time constraint, a storage device (e.g., 640.N) that can process the storage command may be conveniently identified as a fallback option, which the fallback handler 528 may use and/or suggest, as discussed elsewhere herein.

If the controller 642.N of the storage device 640.N determines that it cannot carry out the storage command within the command processing constraint, it may similarly generate a proactive response, which it may provide in a response 609 back to the command handler 532 of the storage device 640.1, send in a response 610 to the request handler 524 of the host system 604, etc. If sent to the command handler 532 of the storage device 640.1, the proactive response may be included in/combined with the proactive response of the storage device 640.1 and sent in a response 608.

The command processor 534 processes the storage command (e.g., reads or writes the data, executes the compute operation, deletes the data, etc.), and provides a result of the processing to other components of the system and/or stores the results in a data store, such as a memory 516, etc. For instance, the command processor 534 may provide the result of the processing to the command handler 532 and/or the estimator 538, and/or stores the results in a memory 516 for retrieve by the command handler 532 and/or the estimator 538. The command handler 532 or another suitable component may receive/retrieve the result and generate and send a corresponding response including the result to the request handler 524 of the processor 605. The request handler 524 may process the response including the result and send a response 615 including a notification with the result, such as a client 630, an application operating on the host system 604, an application operating on the computing device 620, etc.

In further embodiments, some or all of the acts and functionality of the processor 605 and the controller 642 may be combined. For example, a storage device 640 may include the host layer and may receive and handle storage service requests directly from a client 630. As a further example, a request 606' or 606" for the storage command may be sent by another entity of the system 600, such as a computing device 620, which may be a server, a user device (e.g., laptop, mobile phone, tablet computer, desktop, wearable computer, etc.), or another computing device data storage and processing capabilities, etc. A communication interface of the computing device 620 may be coupled directly to communication interface of the storage device 640.1 (e.g., via a wireless data connection, wired data connect, etc.) and the request 606" may be sent directly to the storage device 640.1, or the communication interface of the computing device 620 may be coupled to the communication interface of the storage device 640.1 via the computer network 602 (e.g., one or more intervening devices) and the request 606' may be sent to the storage device 640.1 via the network 602.

In these embodiments, various acts and/or functionality of the processor 522 and the storage controller 530 may be combined. For example, the functionality of the request handler 524 and the command handler 532 may be consolidated into a single handler as intervening communication to a host system 604 may not be necessary, although other variations where components are consolidated and/or further divided up are contemplated and within the scope of this disclosure. In such embodiments, the estimator 538 may similarly proactively determine whether a storage command can be processed according to the time constraint and other parameters that may be set in a manner that is the same or similar to that discussed elsewhere herein.

As with the other embodiments discussed herein, the application operating on the computing device 620 or another applicable requesting device may tag the request with a time constraint and other parameter(s) for the storage command, or the time manager 526 may automatically determine the time constraint based on preferences, predetermined variables, or other suitable logic.

The estimator 538 may self-determine a fallback or provide a response 608' or 608" to the computing device 520 including the proactive determination and allow the application (e.g., operating system, client software, application server software, etc.) operating on the computing device to select which fallback option to use. In response to receiving the notification, the application can send a subsequent request to the storage device 640.1 indicating which fallback option to use and the fallback handler 528 can facilitate execution of the storage command according to that fallback option, as discussed elsewhere herein.

Figure 7:
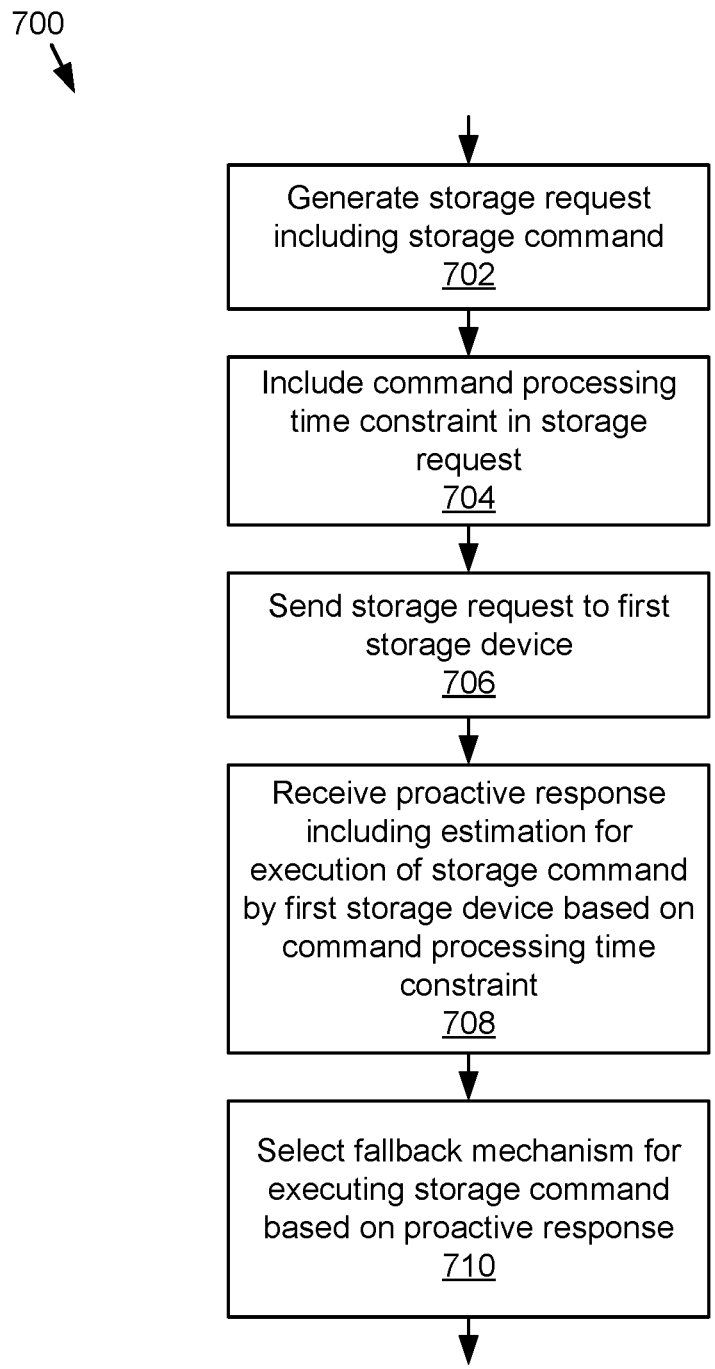
FIG. 7 is a flowchart of an example method for proactively handling storage requests.

FIG. 7 is a flowchart of an example method 700 for proactively handling storage requests.

In block 702, a processor 522 may generate a storage request including a storage command, and in block 704, may include a command processing time constraint in the storage request. In block 706, the processor 522 may send the storage request to a first storage device in a storage system storage pool having a plurality of storage devices including the first storage device, a second storage device, and optionally additional storage devices. In some embodiments, a host system 650 includes the processor 522, which is coupled to the storage pool via a network fabric, in which case the host system 650 and processor 522 is configured to communicate with the storage pool via the network fabric.

In block 708, the processor 522 may receive, from the first storage device, a proactive response including an estimation for an execution of the storage command by the first storage device based on the command processing time constraint.

In block 710, the processor 522, the estimator 538, or another component may select a fallback mechanism for executing the storage command based on the proactive response. In some embodiments involving a host system, the host system may be configured to receive a storage services request from a client device requesting execution of the storage command, and the processor 522 may, responsive to receiving the proactive response, send a storage services response to the client device indicating an estimated amount of time needed to complete the storage command.

Figure 8:
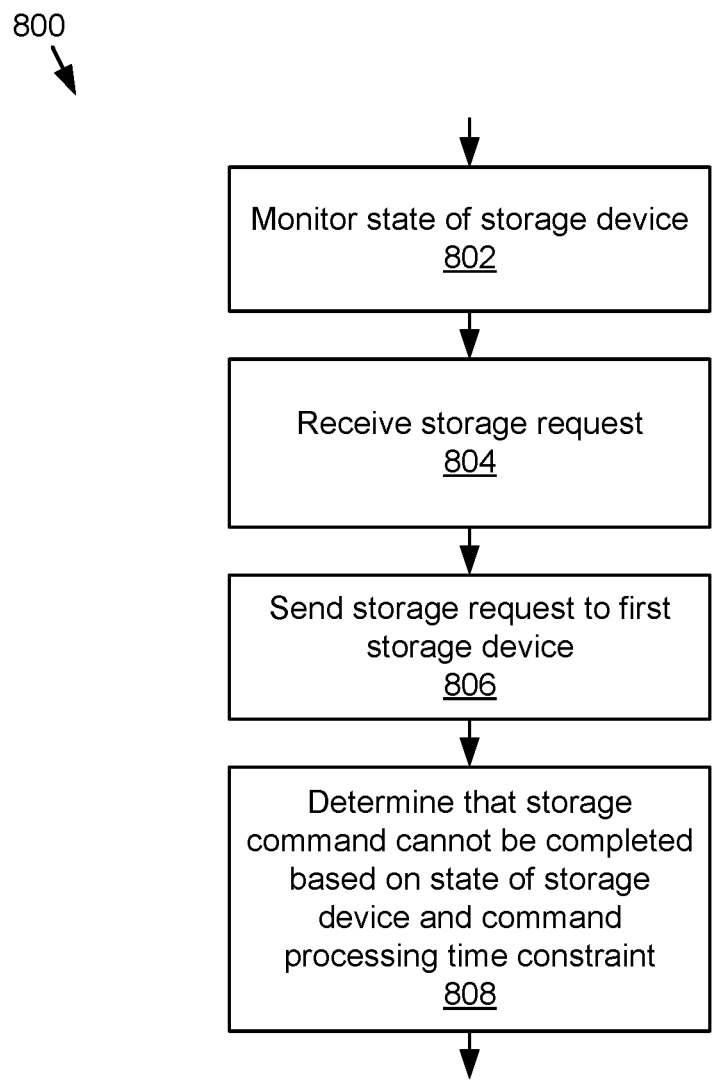
FIG. 8 is a flowchart of an example method for evaluating the processing of a storage command.

FIG. 8 is a flowchart of an example method 800 for evaluating the processing of a storage command. In block 802, the storage controller 530 monitors a state of the first storage device. Example states may include, but are not limited to, a storage device hardware failure, a storage device firmware state, a storage device processing load, or a latency associated with a processing of the storage command.

In block 804, the storage controller 530 receives the storage request, and in block 806, determines that the storage command cannot be completed based on the state of the first storage device and the command processing time constraint. In block 808, the storage controller 530 sends the proactive response to the processor indicating a determination that the storage command cannot be completed.

Figure 9:
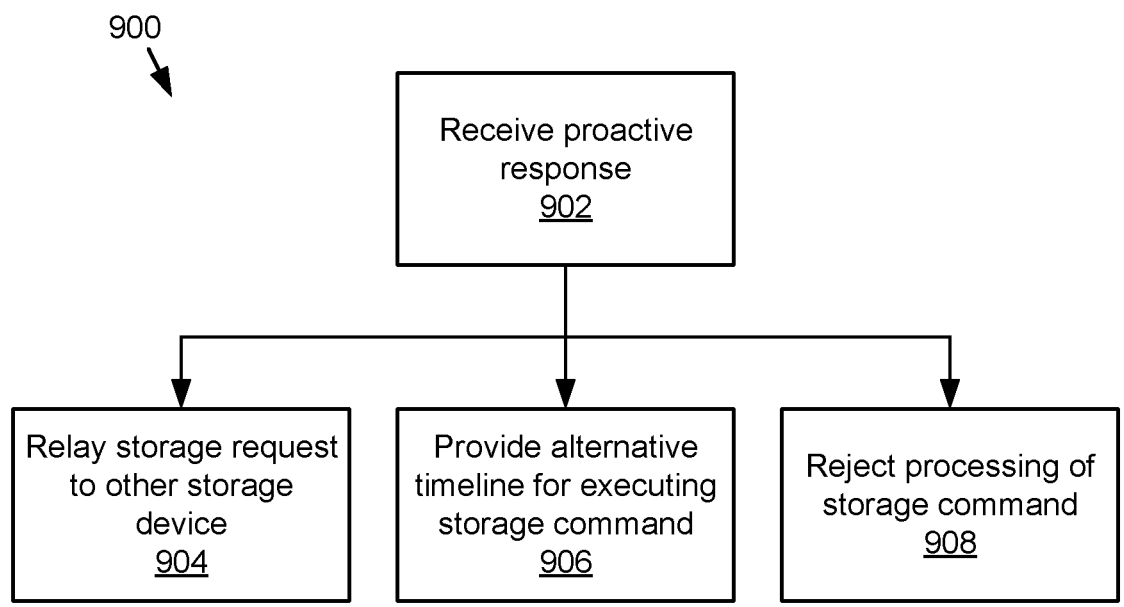
FIG. 9 is a flowchart of an example method for determining a fallback based on a proactive response.

FIG. 9 is a flowchart of an example method 900 for determining a fallback based on a proactive response. In block 902, the processor 522 or storage controller 530 receives the proactive response. The processor 522 or storage controller 530 may determine which fallback option to select based on the proactive response, as reflected by blocks 904, 906, and 908. In particular, in block 904, the processor 522 or storage controller 530 may determine to relay the storage request to the second storage device. In block 906, the processor 522 or storage controller 530 may determine to provide an alternative timeline for executing the storage command. In block 908, the processor 522 or storage controller 530 may reject processing of the storage command.

In some embodiments, the controller 530 includes data in the proactive response indicating a basis for the determination. In such a case, the processor 522, responsive to receiving the proactive response, may select a fallback mechanism for executing the storage command, and select the fallback mechanism for executing the storage command based on the basis for the determination. In some cases, the storage controller 530 may have relayed the storage request to another storage device (e.g., a second storage device), and the proactive response received from the storage controller 530 of the first storage device indicates that the first storage device relayed the storage request to the second storage device for execution. In response, the processor 522 may receive confirmation from the second storage device or the first storage device once the command is executed.

Figure 10:
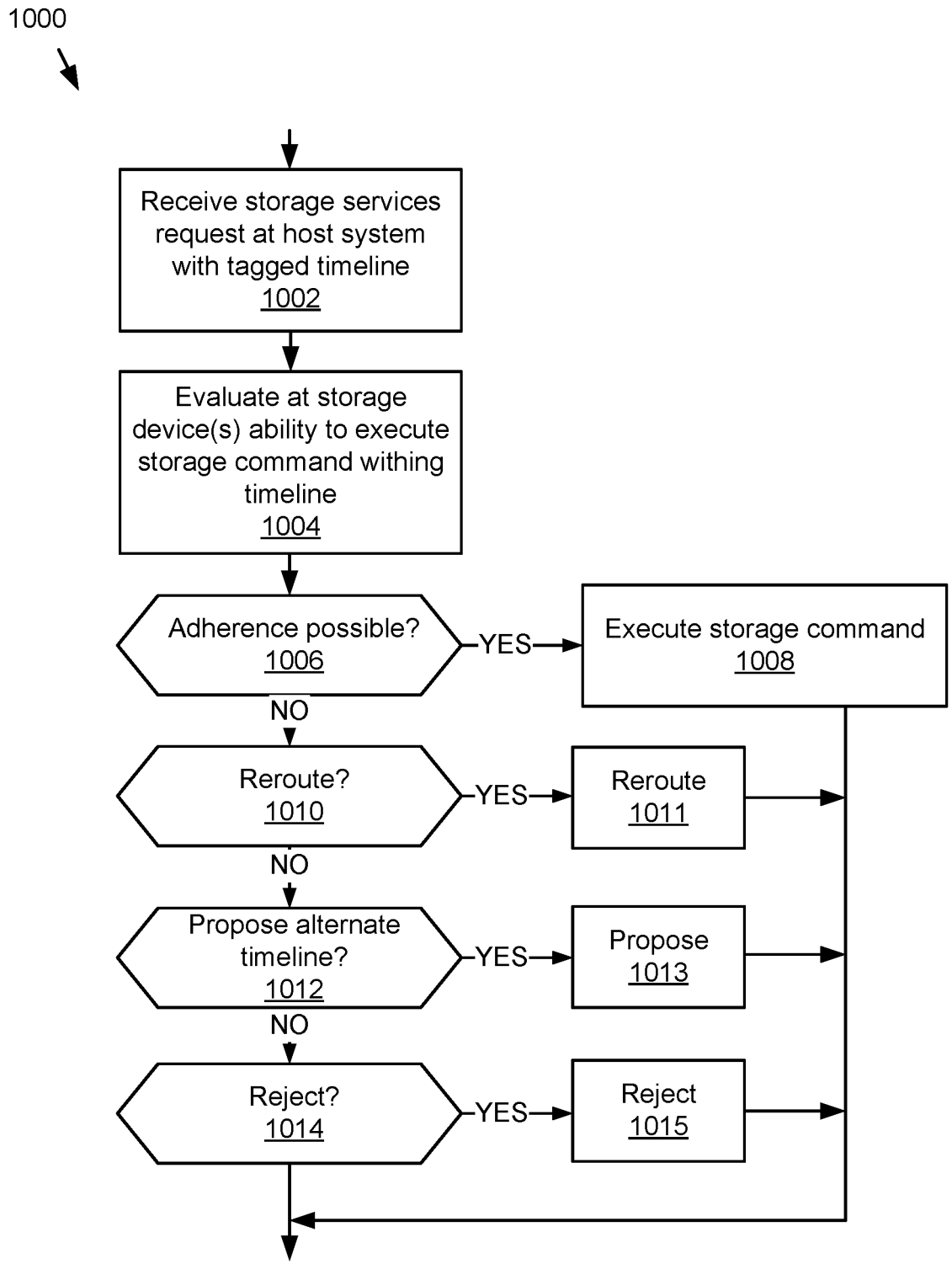
FIG. 10 is a flowchart of a further example method for proactively handling storage requests.

FIG. 10 is a flowchart of a further example method 1000 for proactively handling storage requests.

In block 1002, the host system receives a storage services request. The storage services request is tagged with a timeline. For example, the request may include the requested command and a time tag indicating when time command should be completed by.

In block 1004, the storage device to which the host system relayed the storage services request may evaluate its ability to execute the storage command in accordance with the timeline. As an example, the storage device may respond to several read and write commands. Some or all of the commands include a time tag for completion. If processing the read commands results in the backend of the storage device being busy, and a request is received instructing that a write command has a completion time tag that is not achievable by the storage device, the device may reject the write command.

Accordingly, in block 1006, the storage device determines if adherence with the requested timeline is possible. If so, the storage device in block 1008 executes the storage command and notifies the host system of such.

If not, the method 1000 continues to evaluate one or more fallback options, such as those reflected by blocks 1010, 1012, and 1014. For example, the storage device or the host system determines in block 1010 whether to reroute the request to another storage device, determines in block 1012 whether to propose an alternate timeline for completing the requested command, and determines in block 1014 whether to reject processing of the requested command. If the determination in block 1010 is no, the method 1000 may continue to block 1012. If the determination in block 1012 is no, the method 1000 may continue to block 1014. If the determination in block 1014 is no, the method 1000 may continue to other fallback options, return and inform the requestor that no fallback options are available, end, or continue to perform other processing.

If the determination in block 1010 is yes, the method 1000 may continue to block 1011 and reroute the request. If the determination in block 1012 is yes, the method 1000 may continue to block 1013 and propose an alternative timeline to the client and/or host system. If the determination in block 1014 is yes, the method 1000 may continue to block 1015 and reject processing of the requested command. For example, the host system may receive a proactive response from the storage device, and determine based on the response, and potentially other responses from other storage devices, to reject processing of the command and send notification to the client informing it of the rejection.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

Various aspects of the present technology may be embodied as a system, method, apparatus, computer program product or another aspect. Accordingly, some aspects of the present technology may take the form of a hardware embodiment, a software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer-readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).f Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general-purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

What is claimed is:

1. A storage system, comprising:
a storage pool having a plurality of storage devices including a first storage device and a second storage device; and
a processor coupled to the plurality of storage devices and configured to:
generate a storage request including a storage command;
include a command processing time constraint in the storage request;
send the storage request to the first storage device;
receive, from the first storage device, a first response including an estimation for an execution of the storage command by the first storage device based on the command processing time constraint;
determine a storage command type for the storage command from a plurality of storage command types; and
select, based on the storage command type and responsive to the estimation in the first response not complying with the command processing time constraint, a fallback mechanism for executing the storage command using the storage pool, wherein the selected fallback mechanism comprises:
determining, based on the estimation in the first response, an alternative timeline for executing the storage command using the first storage device; and
resending the storage request to the first storage device with a revised command processing time constraint corresponding to the alternative timeline.

2. The storage system of claim 1, wherein the processor is further configured to:
evaluate, responsive to the estimation in the first response not complying with the command processing time constraint, a plurality of fallback mechanisms for executing the storage command using the storage pool, wherein the selected fallback mechanism is from the plurality of fallback mechanisms.

3. The storage system of claim 1, wherein the first storage device includes an estimator configured to use machine learning logic to determine the first response.

4. The storage system of claim 1, wherein the first storage device includes a controller configured to:
monitor a state of the first storage device;
receive the storage request;
determine that the storage command cannot be completed based on the state of the first storage device and the command processing time constraint; and
send the first response to the processor indicating a determination that the storage command cannot be completed.

5. The storage system of claim 4, wherein the state indicates:
a storage device hardware failure;
a storage device firmware state;
a storage device processing load; or
a latency associated with a processing of the storage command.

6. The storage system of claim 4, wherein:
the controller is further configured to include data in the first response indicating the state of the first storage device; and
the processor is further configured to:
responsive to receiving the first response, select a fallback mechanism for executing the storage command; and
select the fallback mechanism for executing the storage command based on the state of the first storage device and the storage command type.

7. The storage system of claim 1, further comprising:
a host system coupled to the storage pool via a network fabric, wherein:
the host system includes the processor; and
the host system is configured to communicate with the storage pool via the network fabric.

8. The storage system of claim 7, wherein:
the host system is further configured to receive a storage services request from a client device requesting execution of the storage command; and
the processor is further configured to, responsive to receiving the first response:
send a storage services response to the client device indicating an estimated amount of time needed to complete the storage command; and
receive, from the client device, a reply indicating a revised timeframe for processing the storage command.

9. The storage system of claim 1, wherein the first response received from the first storage device indicates that the first storage device relayed the storage request to the second storage device for execution.

10. A computer-implemented method, comprising:
generating a storage request including a storage command;
including a command processing time constraint in the storage request;
sending the storage request to a first storage device in a storage pool;
receiving, from the first storage device, a first response including an estimation for an execution of the storage command by the first storage device based on the command processing time constraint;
determining a storage command type for the storage command from a plurality of storage command types; and
selecting, based on the storage command type and responsive to the estimation in the first response not complying with the command processing time constraint, a fallback mechanism for executing the storage command using the storage pool, wherein the selected fallback mechanism comprises:

determining, based on the estimation in the first response, an alternative timeline for executing the storage command using the first storage device; and resending the storage request to the first storage device with a revised command processing time constraint corresponding to the alternative timeline.

11. The computer-implemented method of claim 10, further comprising:

evaluating, responsive to the estimation in the first response not complying with the command processing time constraint, a plurality of fallback mechanisms for executing the storage command using the storage pool, wherein the selected fallback mechanism is from the plurality of fallback mechanisms.

12. The computer-implemented method of claim 10, wherein the first storage device uses machine learning logic to determine the first response.

13. The computer-implemented method of claim 10, further comprising:

monitoring a state of the first storage device;

receiving the storage request;

determining that the storage command cannot be completed based on the state of the first storage device and the command processing time constraint; and sending the first response indicating a determination that the storage command cannot be completed.

14. The computer-implemented method of claim 13, wherein the state indicates:

a storage device hardware failure;

a storage device firmware state;

a storage device processing load; or a latency associated with a processing of the storage command.

15. The computer-implemented method of claim 13, further comprising:

including data in the first response indicating the state of the first storage device;

responsive to receiving the first response, selecting a fallback mechanism for executing the storage command; and selecting the fallback mechanism for executing the storage command based on the state of the first storage device and the storage command type.

16. The computer-implemented method of claim 10, wherein:

the storage request is sent to the first storage device via a network fabric by a host system; and the first response is received by the host system via the network fabric from the first storage device.

17. The computer-implemented method of claim 16, further comprising:

receiving a storage services request from a client device requesting execution of the storage command; and responsive to receiving the first response:

sending a storage services response to the client device indicating an estimated amount of time needed to complete the storage command; and receiving a reply indicating a revised timeframe for processing the storage command.

18. The computer-implemented method of claim 10, wherein the first response received from the first storage device indicates that the first storage device relayed the storage request to a second storage device for execution.

19. The computer-implemented method of claim 10, further comprising:

sending a second storage request to a second storage device in parallel with the storage request;

receiving a second response from the second storage device; and selecting between the first storage device and the second storage device to execute the storage command based on the first response and the second response.

20. A system, comprising:

means for storing data in a storage pool;

means for generating a storage request including a storage command;

means for including a command processing time constraint in the storage request;

means for sending the storage request to the means for storing data;

means for receiving, from the means for storing data, a first response indicating an estimation for an execution of the storage command by the means for storing data based on the command processing time constraint;

means for determining a storage command type for the storage command from a plurality of storage command types; and means for selecting, based on the storage command type and responsive to the estimation in the first response not complying with the command processing time constraint, a fallback mechanism for executing the storage command using the storage pool, wherein the selected fallback mechanism comprises:

determining, based on the estimation in the first response, an alternative timeline for executing the storage command using the means for storing data; and resending the storage request to the means for storing data with a revised command processing time constraint corresponding to the alternative timeline.

* * * * *